INVENTOR.
ELMER D. DILLING
BY
Clement H. Allen
AGENT

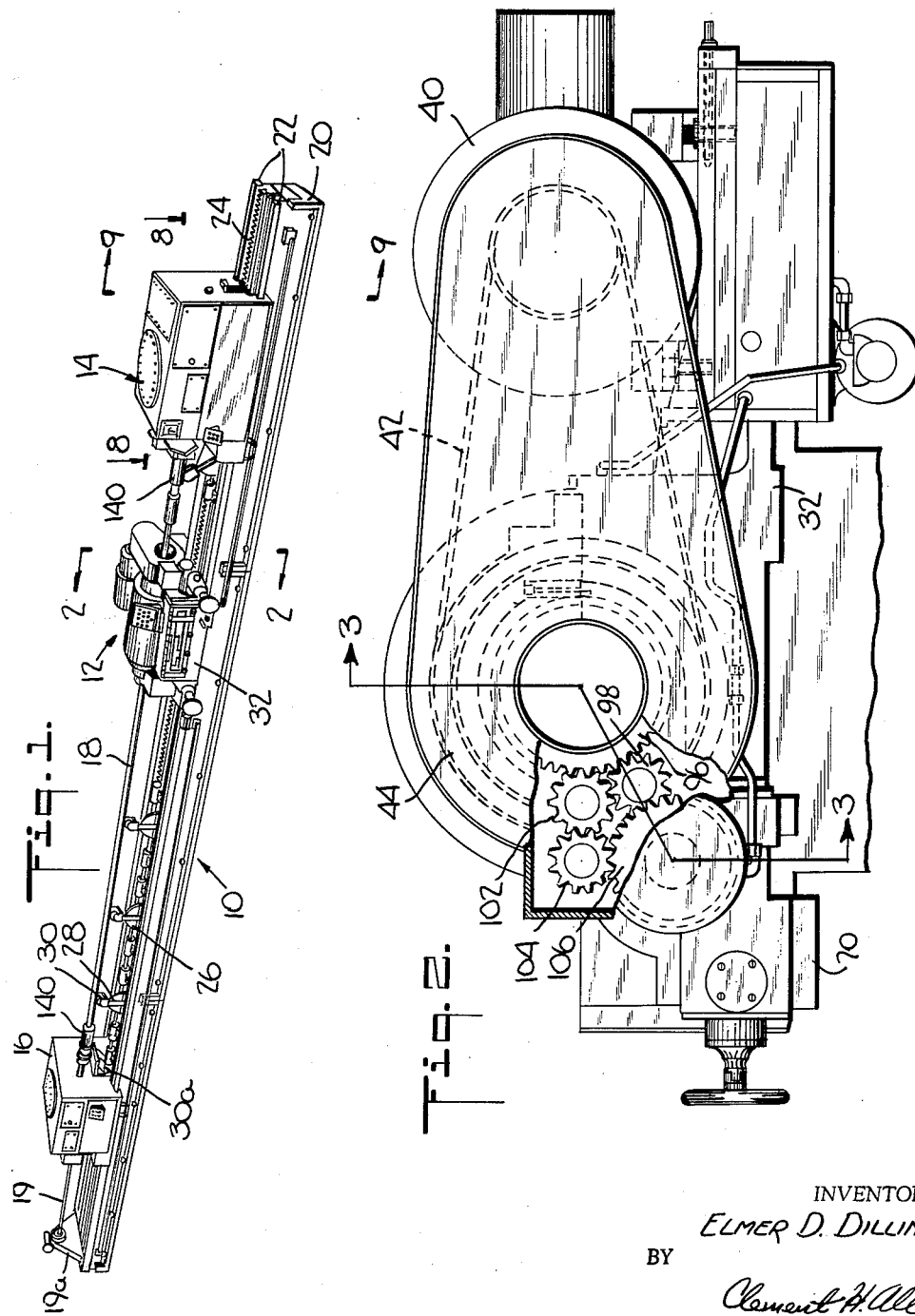

March 8, 1966 E. D. DILLING 3,238,752
TUBE REDUCING APPARATUS
Filed Oct. 12, 1964 7 Sheets-Sheet 3

INVENTOR.
ELMER D. DILLING
BY
Clement H. Allen
AGENT

INVENTOR
ELMER D. DILLING
BY Clement N. Allen
AGENT

March 8, 1966  E. D. DILLING  3,238,752
TUBE REDUCING APPARATUS
Filed Oct. 12, 1964  7 Sheets-Sheet 5

INVENTOR.
ELMER D. DILLING
BY
Clement H. Allen
AGENT

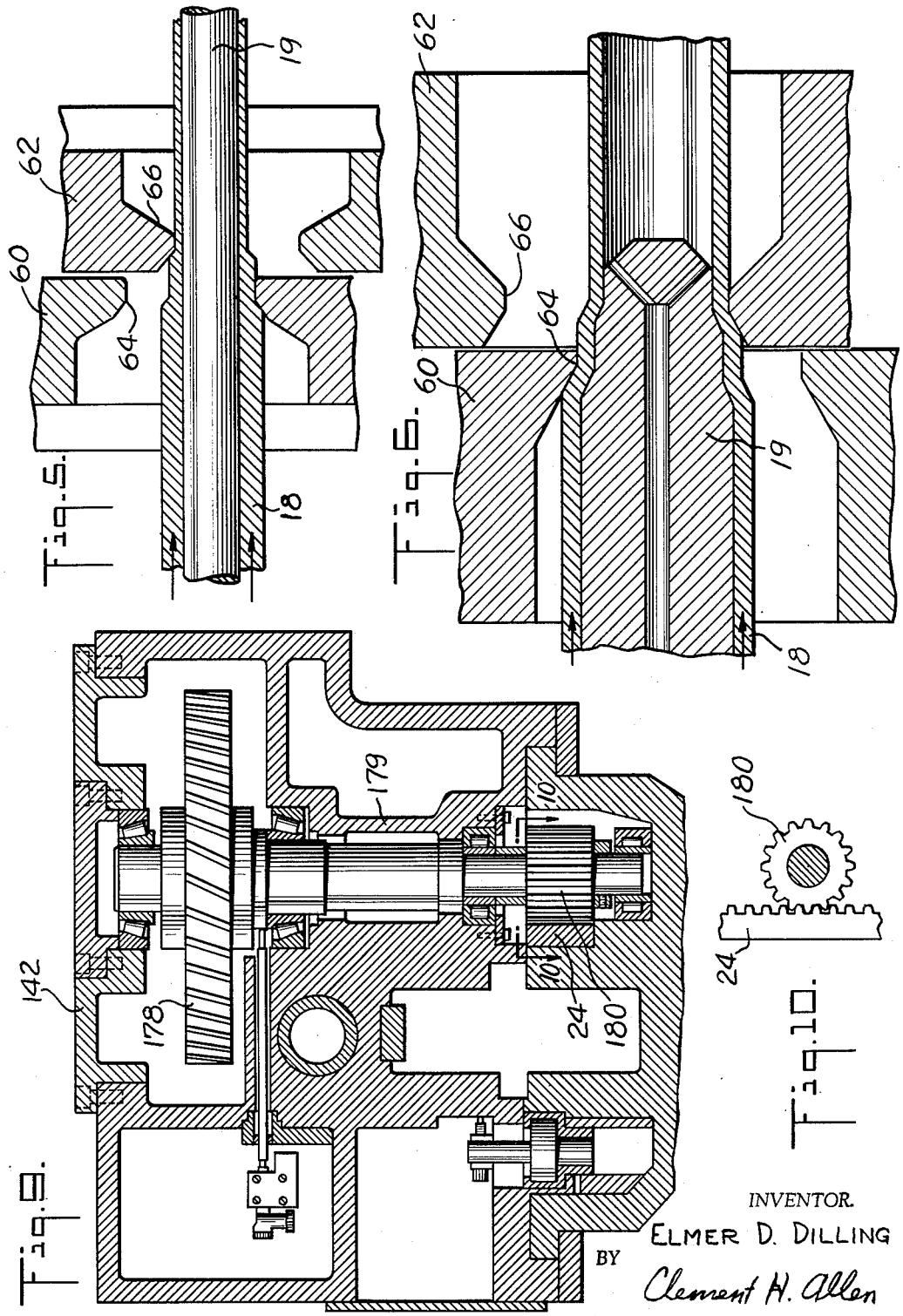
INVENTOR.
ELMER D. DILLING
BY Clement H. Allen
AGENT

INVENTOR.
ELMER D. DILLING
BY
Clement H. Allen
AGENT

United States Patent Office 3,238,752
Patented Mar. 8, 1966

3,238,752
TUBE REDUCING APPARATUS
Elmer D. Dilling, Las Vegas, Nev., assignor to Titanium Metals Corporation of America, New York, N.Y., a corporation of Delaware
Filed Oct. 12, 1964, Ser. No. 403,099
18 Claims. (Cl. 72—10)

This invention relates to metal forming devices and more particularly it concerns an apparatus for reducing the diameter and/or wall thickness of workpieces such as elongated tubing.

The invention is particularly suited for use in connection with a metal working process, known as flow-turning. According to this process, a workpiece tube is pulled longitudinally through a work head while ring working elements within the work head roll circumferentially around the tube, pressing radially against its outer surface and causing plastic deformation of the tube walls. Apparatus of this character is described in my copending applications Serial No. 78,469, filed December 27, 1960, now Patent No. 3,182,475; Serial No. 157,745, filed December 7, 1961, now Patent No. 3,164,043; Serial No. 158,568, filed December 11, 1961; and Serial No. 161,721, filed December 22, 1961, of which the present application is a continuation-in-part. The present application is directed to various improvements upon apparatus of the type described in said parent applications.

The improved flow-turning apparatus of the present invention utilizes an elongated base upon which is fixedly mounted a work head. Carriages are arranged to ride along the base on either side of the work head, one to pull a workpiece tube longitudinally through the work head at a preselected rate of speed, and the other to apply to the tube a preselected amount of back tension. The carriages are also provided with workpiece grippers which grasp the ends of the workpiece tube for moving the same through the work head in the manner above described.

The carriages are provided with variable speed drive motors which cause them to move along the base at controllable rates. The carriage pulling the workpiece through the work head applies forward tension to the workpiece but its controlled speed is related to the work head operation.

Tension sensing means are provided between the carriage that applies back tension and its workpiece gripper. These tension means respond to the back tension exerted by the carriage on the workpiece and operate through a hydraulic system to control the speed of the carriage drive motor. This carriage is thus caused to move at proper speed to sustain a precise amount of back tension on the workpiece tube while the other carriage pulls the tube longitudinally through the work head. It has been found that by maintaining a precise amount of back tension, as aforesaid, the capacity of the machine to effect tube reduction is greatly enhanced, as is the ability thereof to produce a uniform product of precision quality.

The work head comprises a frame mounted to rotate about the workpiece tube axis, and a plurality of working rings mounted within the frame to rotate freely about axes eccentric to the frame and workpiece axis. The workpiece tube passes through the working rings so that one side of the inner surface of each ring presses radially against the workpiece. As the frame rotates the working rings roll circumferentially about the workpiece tube exerting radial working pressure thereagainst so as to produce plastic flow of the tubing metal. A forming mandrel is attached at one end of the base and extends longitudinally within the unworked portion of the workpiece tube. The mandrel is shaped and arranged to terminate at a precise location in the vicinity of the working rings in order to control the inner as well as the outer diameter of the workpiece tube.

An important aspect of the present invention involves an arrangement whereby the amount of relative eccentricity of the working rings can be controlled with ease and precision while the machine is in operation. According to this arrangement each working ring is mounted to rotate eccentrically within an adjusting ring which itself is mounted to be adjustably rotated eccentrically within the frame. By turning the adjusting ring about its axis, the eccentricity of the working ring axis relative to the frame and workpiece axis can be controlled. This adjustment is carried out by means of a sun gear mounted to rotate coaxially with, but independently of, the frame, and a gearing arrangement on the frame which transfers rotational movements of the sun gear to rotation of the adjusting ring. An external differential gear system is also provided and the frame is connected to drive through the differential to the sun gear. This connection includes a reversing gear, and the various gears are sized so that when the intermediate or planet carrier of the differential is stationary, the frame causes the sun gear to rotate in the same direction and at the same speed as the frame itself. A differential in the relative speed of rotation of the frame and sun gear is introduced by turning the planet carrier. This differential is transmitted to the adjustment ring, causing it to move the radial position of the working ring.

Having thus described the invention in general terms, reference will now be had for a more detailed description to the annexed drawings, wherein:

FIG. 1 is a perspective view of a tube reducing apparatus in accordance with a preferred embodiment of the present invention.

FIG. 5 is an enlarged view of the tool working portion of the machine illustrated in FIG. 3 and further showing a tubular workpiece and one type of forming mandrel.

FIG. 7 is an enlarged sectional showing of the lower right-hand portion of FIG. 3.

FIG. 8 is an enlarged fragmentary longitudinal sectional view of one of the carriages as taken at 8—8 of FIG. 1.

FIG. 9 is a fragmentary transverse sectional view of the same carriage as taken at 9—9 of FIG. 1.

FIG. 10 is a fragmentary sectional view taken at 10—10 of FIG. 9.

Figure 3:
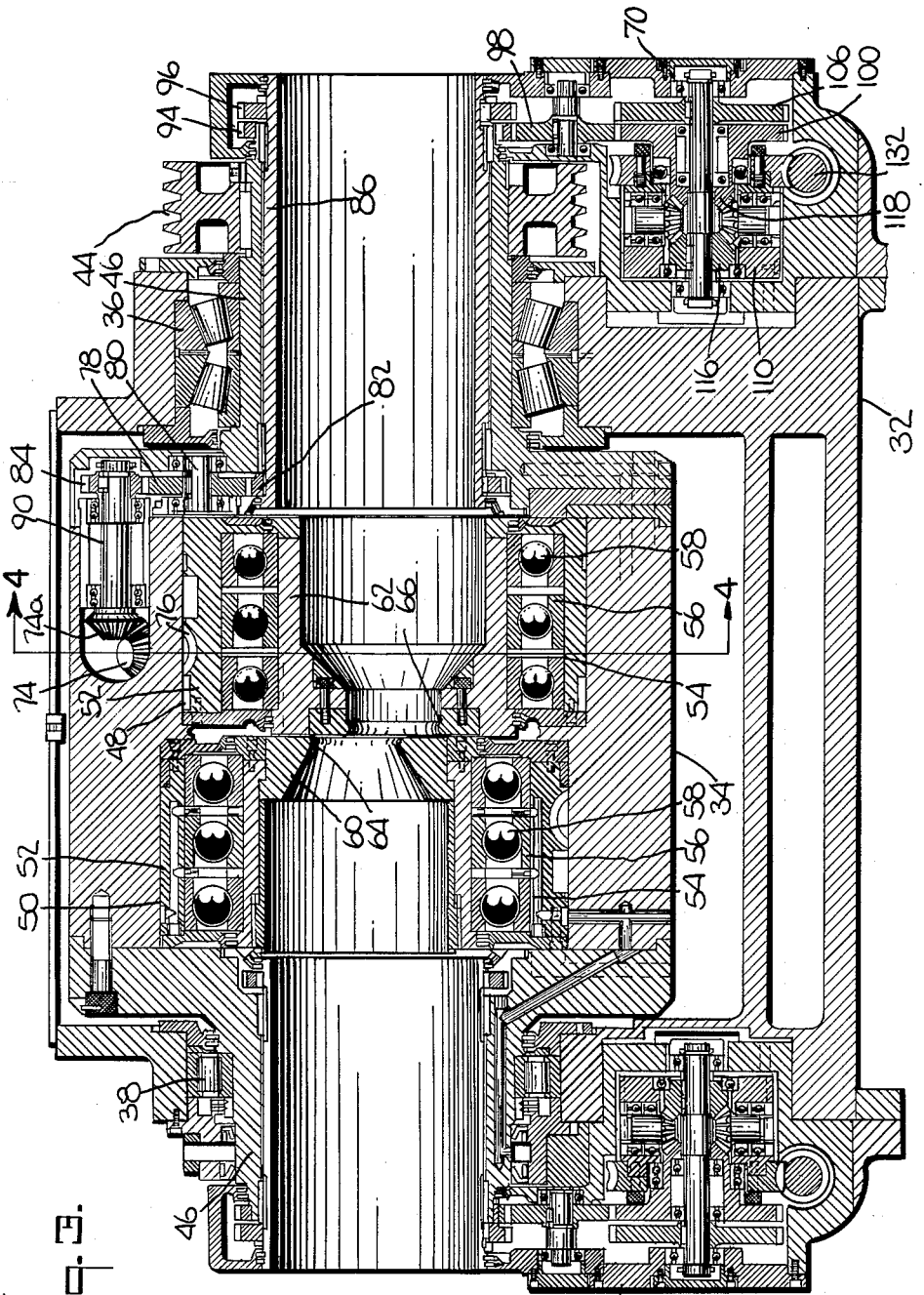
FIG. 3 is an enlarged longitudinal sectional view of the work head as taken at 3—3 of FIG. 2.

Referring to FIG. 1, the tube reducing machine comprises an elongated base 10, a work head 12 stationarily mounted on the base, and of the work head. The carriages are adapted to grasp a workpiece tube 18 and to move the tube longitudinally through the work head 12 while the work head, remaining in a fixed position, performs its tube reducing operations. The speed at which each carriage moves along the elongated base 10 is specially controlled to maintain precise degrees of forward rate of speed and back tension on the workpiece tube 18. A tube-forming mandrel 19 is rotatably attached to a support 19a mounted at one end of the base 10, and extends through the workpiece tube 18 up to the work head 12. The mandrel cooperates with the tube working elements in the work head to produce desired reductions in the internal as well as external finished diameter of the workpiece tube 18.

The base 10 is formed with a bed portion 20 along which extend upstanding guide flanges 22 and a gear rack 24. The right and left carriages 14 and 16 are constructed to ride along the guide flanges 22 and to be driven therealong by means of an internal gear arrangement which meshes with the gear rack 24. The work head 12, like the carriages 14 and 16, is also constructed to ride along the base 10 and to be guided thereon by means of the guide flanges 22. However, since the work head does not move on the base during normal operation, it may be clamped thereon at any desired location.

As shown in FIG. 1, variable portions of the workpiece tube 18 extend during operation considerable distances between the work head 12 and one or the other of the carriages 14 and 16. In order to prevent sagging and misalignment of the workpiece tube, there are provided along the bed portion 20 of the base 10, a plurality of roller support assemblies 26. Each of these assemblies comprises an upright member 28 pivoted to the base 10 to rotate between an upright position as shown, and a horizontal position even with the surface of the base 10. A roller 30 is mounted at the upper end of each upright 28 and provides a rolling support for the workpiece tube 18, permitting it to roll along on either side of the work head. The roller support assemblies 26 are spring biased to assume an upstanding position for supporting the workpiece tube 18. However, as the carriages 14, 16, move along they push against the various roller support assemblies, causing them successively to pivot down into the base so that the carriages can proceed without interference, the carriages being appropriately slotted to this end, as at 30a. It will be appreciated that as the carriages pass over and beyond successive support assemblies, they are released to assume the normal upright position under spring actions.

Figure 4:
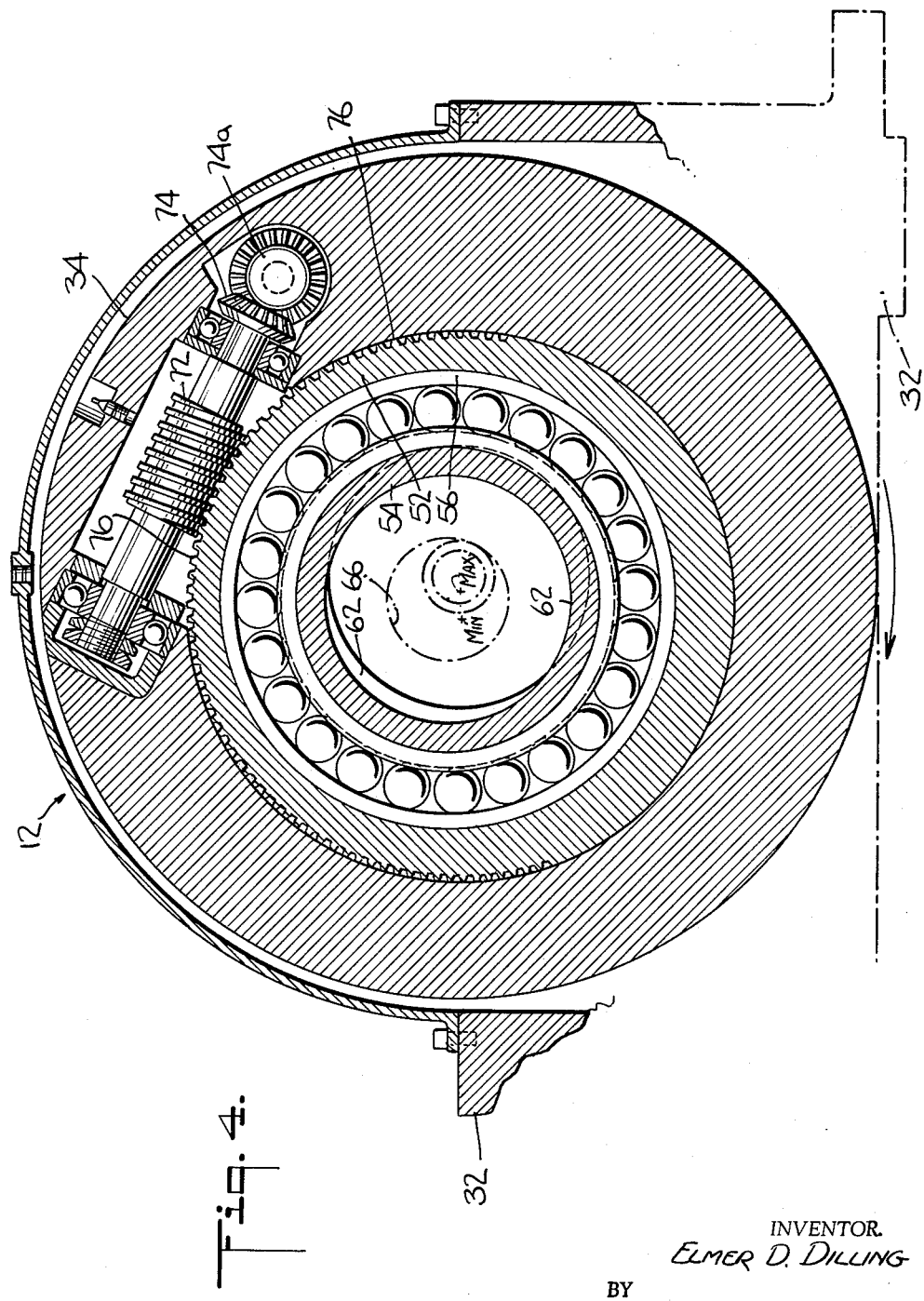
FIG. 4 is a transverse sectional view of the work head as taken at 4—4 of FIG. 3.
Figure 2:
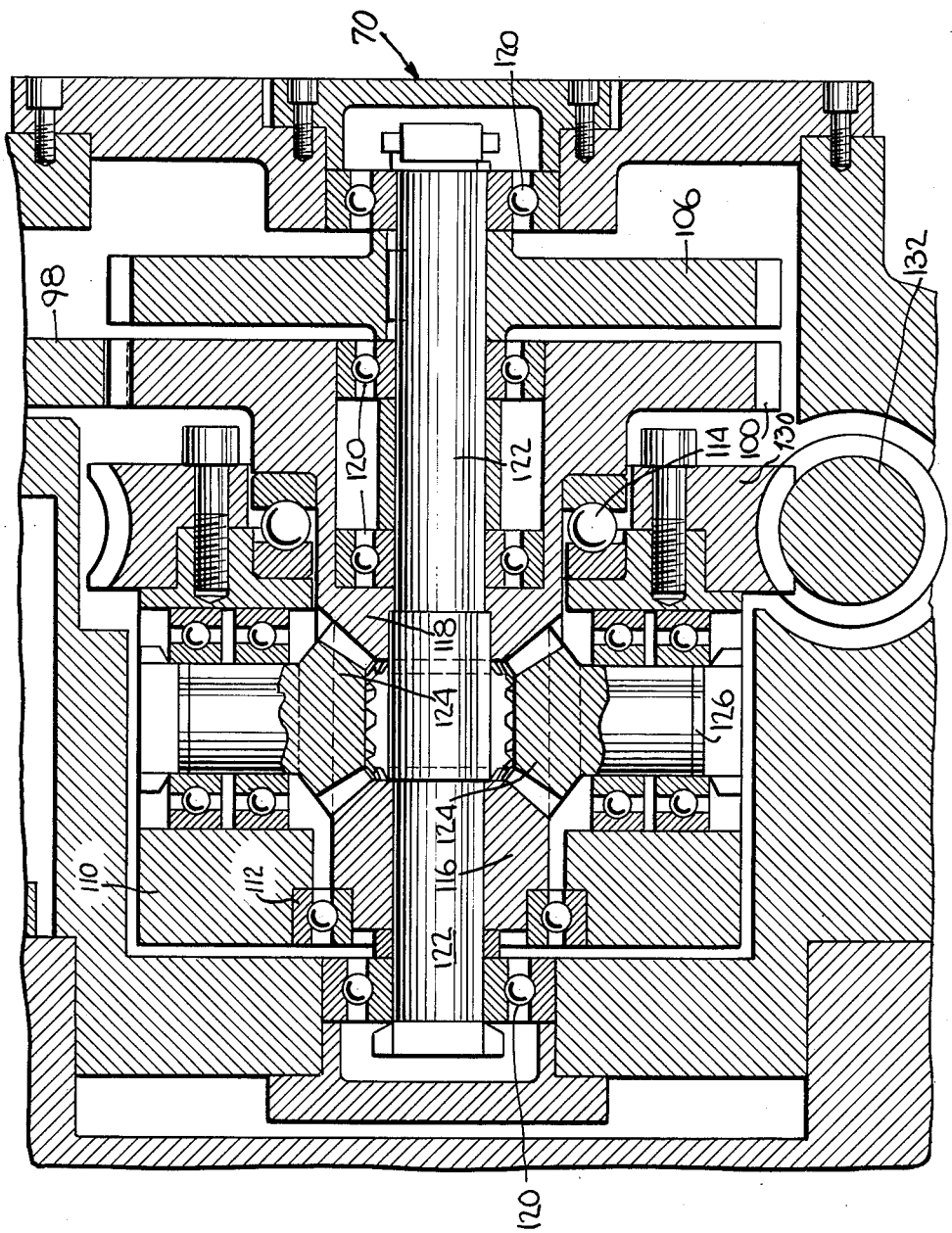
FIG. 2 is an enlarged transverse sectional view of FIG. 1 as taken substantially at 2—2 of FIG. 1.

The work head 12, as shown in FIGS. 2, 3 and 4, includes a housing 32 which is attached to the elongated base 10 as afore-described. A rotating frame 34 is mounted by means of tapered and cylindrical bearings 36 and 38 at either end thereof to rotate within the housing 32 about an axis parallel to the base 10. The rotating frame 34 is driven by means of a motor 40 whose output is connected by means of a belt drive 42 to an input pulley 44 keyed to one of two tubular extensions 46 formed at each end of the rotating frame 34. The rotating frame 34 is provided in its central portion with a pair of axially displaced eccentric bores 48 and 50, arranged such that their eccentricities are diametrically opposed. As shown in FIG. 4, a separate adjusting ring 52, itself having an eccentric bore 54 is mounted to rotate within each eccentric bore in the rotating frame 34. The bores 54 through the adjusting rings 52 are each provided with bearing races 56 which support by means of a plurality of ball bearings 58, rotatable working rings 60 and 62. The first working ring 60 is formed with a tapered tool portion 64 immediately adjacent to a tapered tool portion 66 formed on or attached to the second working ring 62, as shown in FIG. 5.

During operation of the work head a workpiece tube is moved longitudinally and without rotation from left to right, as viewed in FIG. 3, along the axis of rotation of the rotating frame 34. Initially the tube becomes engaged by one point of the tool portion 64 of the working ring 60. Because of the eccentricity of the bores 48 and 54 in the rotating frame 34, as well as the eccentricity in each of the adjusting ring bores 54, the working rings 60 and 62 will be off-center relative to the rotational axis of the rotating frame 34. As a result, the working rings contact, respectively, diametrically opposite points of the workpiece tube 18 as it passes through the tool assembly 12. As the rotating frame 34 rotates, the working rings move about the circumference of the workpiece tube 18 exerting constant radial pressure from opposite directions as to cause a working-down of the tube to a smaller diameter.

Figure 6:
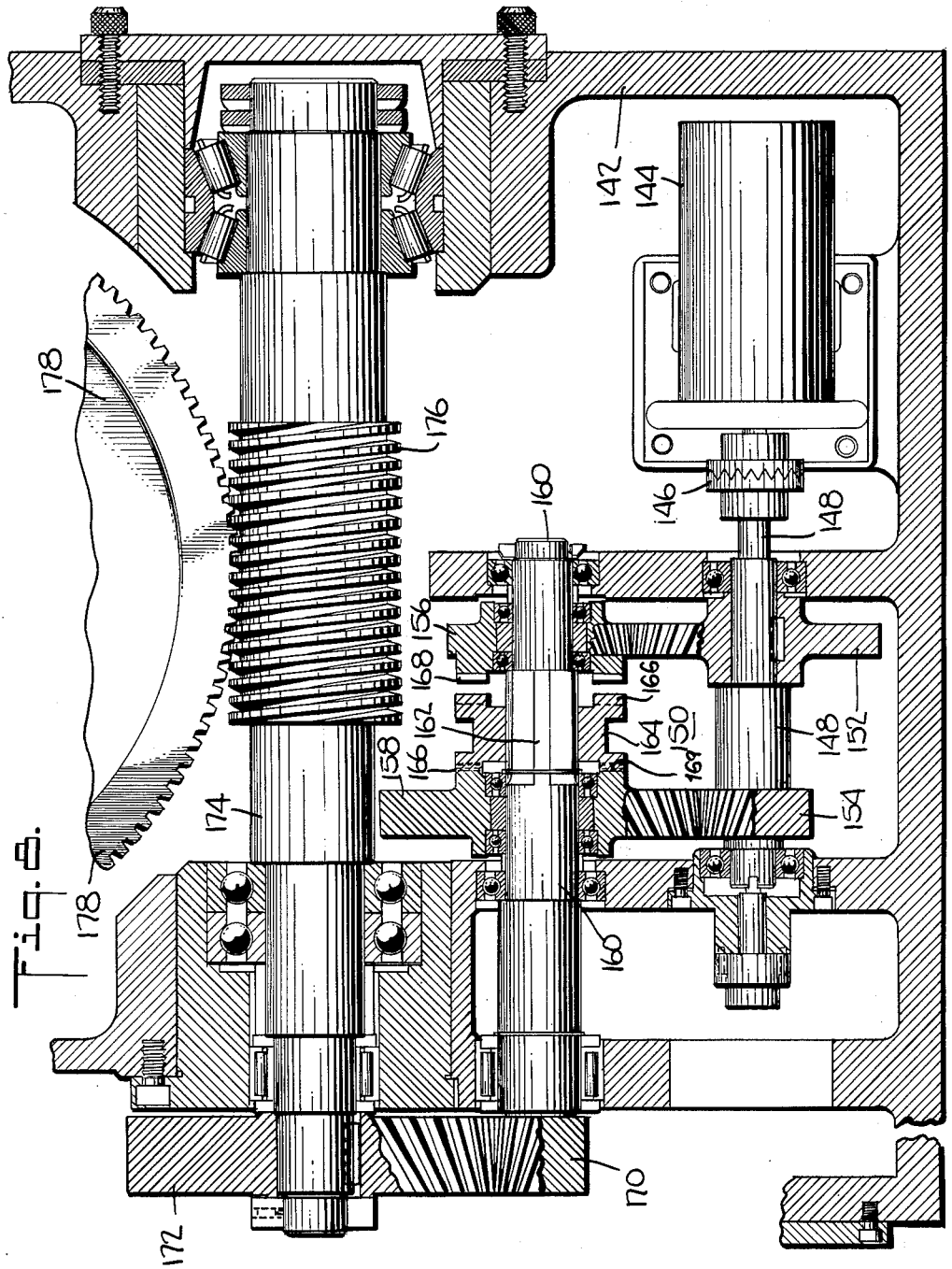
FIG. 6 is a view similar to FIG. 5 but showing a different type of forming mandrel.

As shown in FIG. 5, where the forming mandrel 19 is of constant outer diameter and extends beyond the working rings, there will be produced a reduction in wall thickness. Where on the other hand the mandrel 19 terminates and is stepped in the vicinity of the working rings, as shown in FIG. 6, there will be produced a reduction in outer diameter and/or wall thickness depending upon the size and shape of the mandrel tip.

One of the more important features of the present machine lies in its capacity for providing convenient and accurate adjustment of the working rings so as to produce a change in the diameter of the finished workpiece tube during rotation of the fame 34. To this end, there is provided for each of the working rings 60 and 62, a differential assembly 70 and an adjusting ring drive arrangement interconnected with the differential assembly. Since the mechanisms are substantially identical, the following description of the arrangement for adjusting the second working ring 62 will suffice for each.

It will be appreciated that as the adjusting ring 52 rotates relative to the rotating frame 34, the center of the eccentric bore 54 in the adjusting ring 52 will move with respect to the center of rotation of the rotating frame 34. This relative rotation between the adjusting ring 52 and the rotating frame 34 is controlled, as shown in FIG. 4, by means of an adjusting ring drive worm 72 which is mounted in the rotating frame and which in turn is controlled by a bevel gear drive 74. The adjusting ring drive worm 72 meshes with peripheral gear teeth 76 formed about the outer surface of the adjusting ring 52. Thus, as the drive worm 72 rotates, the adjusting ring 52 is caused to turn relative to the rotating frame 34, thereby adjusting the degree of eccentricity of its working ring 62. However, when the adjusting ring drive worm is stationary, the adjusting ring 52 simply moves as though it were an integral part of the rotating frame 34.

The bevel gear drive 74 operates in response to turning forces transmitted thereto via a meshing bevel gear 74a keyed to a shaft 90 having keyed to its opposite end a spur gear 84 which meshes with a planet gear 78, FIG. 3. Gear 78 is mounted for rotation about a spindle 80, which in turn is carried by the rotating frame 34 at a point displaced from its axis. The planet gear 78 is meshed between a sun gear 82 and gear 84, thereby to operate the bevel gear drive 74, and consequently the adjusting ring drive worm 72. It will be appreciated that when the sun gear 82 rotates at the same speed as the rotating frame 34, then the planet gear 78 is carried around the sun gear and is not caused to rotate on its spindle 80. Consequently, it will not, in this situation transmit rotational movement through the drive gear 84 and bevel gears 74, 74a, to the drive worm 72 and adjust ring 52. Thus, when the sun gear 82 rotates at the same speed as the rotating frame 34, the adjusting ring 52 is carried about within the rotating frame as though it were locked thereto, and the working ring 62 operates to generate a fixed diameter on the workpiece tube. However, when any relative rotation takes place between the sun gear 82 and the rotating frame 34, then the planet gear 78 is caused to turn on its spindle 80. When this occurs, the planet gear 78 drives through the drive gear 84, the bevel gear drive 74, 74a to cause rotation of the adjusting ring drive worm 72. This in turn rotates the adjusting ring 52 relative to the rotating frame 34, thereby changing the distance between the axis of the working ring 62 and the rotational axis of the rotating frame 34.

The mechanism for producing relative rotation between sungear 82 and the rotating frame 34 will now be described. As shown in FIG. 3, the sun gear 82 is keyed to one end of an inner tubular member 86 which is positioned coaxially within the rotating tubular frame extension 46. To the outer ends of each of the rotating tubular frame extension 46, and the inner tubular member 86, are keyed first and second gear elements 94 and 96. The first gear element 94, which is connected via the tubular extension 46 to the rotating frame 34, drives through a single intermediate gear 98, rotatably mounted on the housing 32, a sun connected gear 100, on one side of the differential assembly 70. The second gear element 96, which is connected via the inner member 86 to the sun gear 82, drives via a pair of intermediate gears 102 and 104 (see FIG. 2), and a rotating frame connected gear 106, the opposite side of the differential assembly 70.

The construction of the differential assembly 70 is shown most clearly in the enlarged view of FIG. 7. This assembly is seen to comprise a rotatable carrier 110 mounted by means of bearings 112 and 114 for rotation within the housing 32. Within the differential assembly there is also provided left and right beveled pinion gears designated, respectively, at 116 and 118. These gears rotate coaxially with the rotatable carrier 110 and are supported by means of additional bearings 120. The left beveled pinion gear 116 is connected by means of a central shaft 122 to the sun connected gear 106. Similarly, the right beveled pinion gear 118 is interconnected to the rotating frame connected gear 100. A plurality of beveled planet gears 124 are mounted for rotation about axles 126 carried by the rotatable carrier 110. These axles extend radially to the rotational axis of the carrier 110 so that their planet gears 124 may each mesh between the left and right beveled pinion gears 116 and 118.

It will be seen that where the rotatable carrier 110 does not rotate, the rotation of the rotating frame connected gear 100 will drive the right beveled pinion gear 118. This in turn will cause the various planet gears 124 within the carrier 110 to rotate about their axles 126 and thus cause rotation in the opposite direction of the left beveled pinion gear 116 and similar rotation of the sun connected gear 106. However, since the sun connected gear 106 operates via two intermediate gears 102 and 104 to the sun gear 86, while the rotating frame connected gear 100 operates only through the single intermediate gear 98 to be turned by the rotating frame 34; the rotation reversal produced by the differential assembly 70 is canceled and the sun gear 96 is caused to turn at the same speed and the same direction as the rotating frame 34. Thus, when the rotatable carrier 110 remains stationary, the adjusting ring 52 remains fixed within the rotating frame 34 as though it were an integral part thereof.

Referring again to FIG. 7, it will be seen that the rotatable carrier 110 is provided with a peripheral gear 130 which meshes with an adjustment worm gear 132. Rotation of this adjustment worm gear causes turning of the rotatable carrier 110 so that its planet gears are carried about the left and right bevel gears 116 and 118, causing a change in the relative speed between these two gears. This change in relative speed is transmitted by the sun connected gear 106 and the rotating frame connected gear 100 to the sun gear 86 and the rotating frame 34. As a result of this difference in rotational speed, the planet gear 78 is caused to rotate and to turn the adjusting ring drive worm 72. As a result, the adjusting rings 52 are caused to turn within the rotating frame 34 so as to adjust the radial eccentricity of the working ring 62. It will be seen from the above that the adjustment of the working ring 62 is controlled simply by turning the adjustment worm gear 132 by a corresponding amount. It is important to note in this connection that such adjustment can be made while the tube reducing device is in actual operation and while the workpiece tube is being pulled through the tool assembly 12. By controlling the adjustment of the working rings during this time, various tapered effects can be produced on the workpiece tube.

Figure 11:
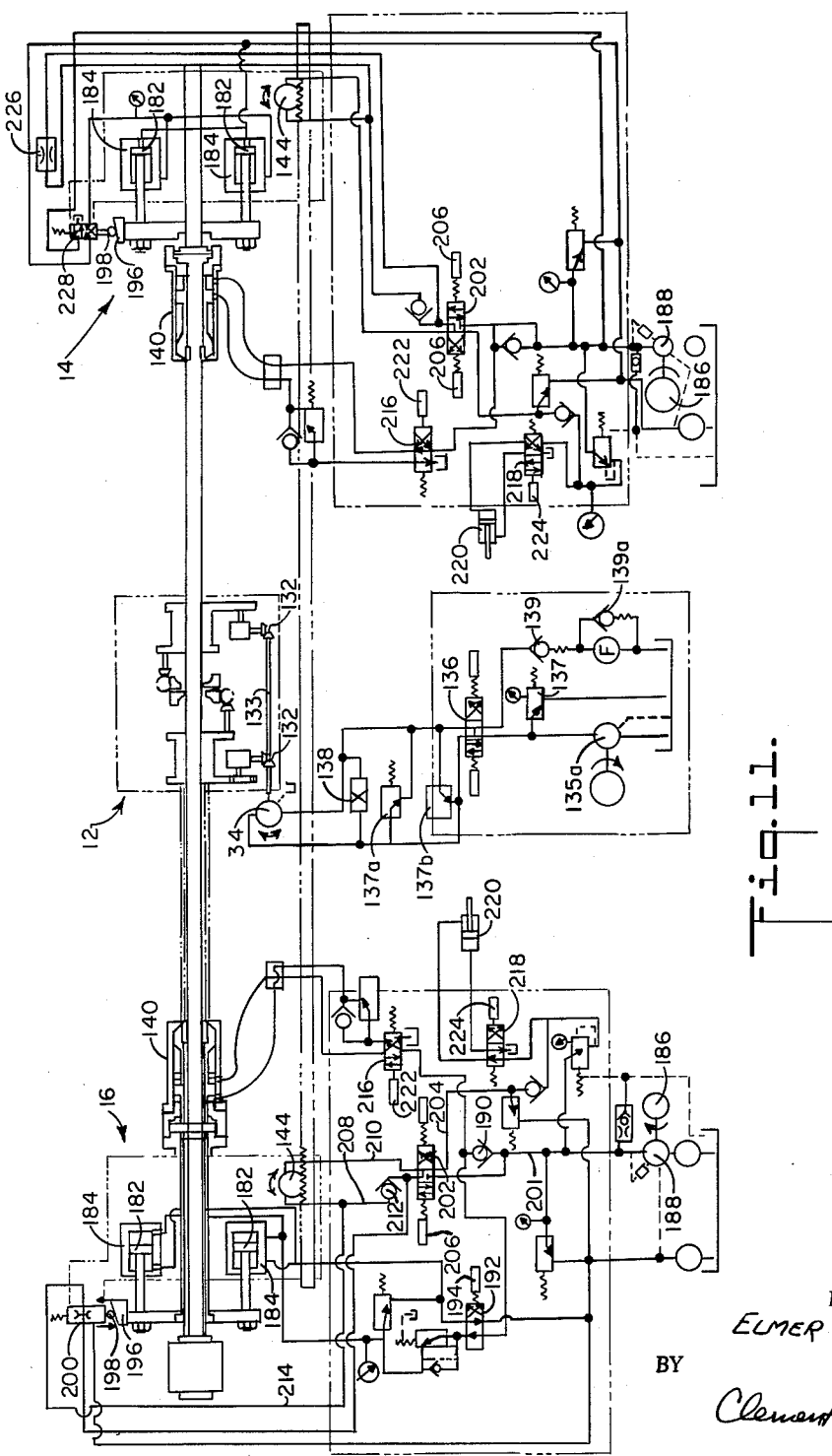
FIG. 11 is a schematic showing of the control features of the present invention.

The tool asembly is controlled during operation by means of a hydraulic system shown schematically in FIG. 11. As shown in this diagram, both of the adjustment worm input gears 132 are geared to a common driveshaft 133 which is rotated by means of a single hydraulic motor 134. This ensures that the adjustment of each of the working rings will be precisely coordinated. There is provided in connection with the tool assembly 12, a hydraulic pump motor 135 and pump 135a which cooperate to drive fluid through double acting or four-way valve 136 through which the fluid may be directed to either line serving the motor 134 to rotate it in either direction. A pressure relief valve 137 is placed in the pump output line as shown. Further pressure relief valves 137a and 137b are arranged across these lines from the high pressure to the return side, depending on which line is carrying the high pressure fluid as selected by valve 136. A bypass valve 138 also crosses the motor supply lines to bypass the motor 134 if desired. The return line from motor 134 is corrected via check valves 139 and 139a with which is combined a filter to drain into a sump or container which also serves as a supply source for pump 135a. It will be evident that by controlling the position of four-way valve 136 the relative position of working rings 60 and 62 may be adjusted inwardly, closer together, or outwardly, further apart, or not at all; and the ease and accuracy of this adjustment is not in the least subject to the speed or direction of rotation of frame 34.

The mechanism for moving the right and left carriages along the base 10 is best shown in FIGS. 8, 9 and 10. The carriages, like the work head, are each provided with workpiece gripper 140 and a housing 142 which is arranged to fit over and ride along the guide flanges 22 on the base 10. A hydraulically operated drive motor 144 is provided within each carriage housing and is arranged to drive through a flexible coupling 146 and turn an input shaft 148 of a high speed-low speed transmission mechanism 150. This transmission mechanism includes a high speed input gear 152 and a low speed input gear 154, both of which are keyed and rotate with the input transmission gear 156 and a low speed transmission gear 158. These transmission gears in turn rotate freely about a common transmission shaft 160. The common transmission shaft is splined, as at 162, in the region intermediate the two transmission gears. A shifter element 164 rides along the splines of the transmission shaft 160 and is movable between the high and low speed transmission gears 156 and 158. The shifter element is provided with clutch teeth 166 about its oppositely facing surfaces, these clutch teeth being engageable selectively with corresponding teeth 168 on the side face of high speed gear 156 and teeth 169 on low speed transmission gear 158. By moving the shifter element reciprocally to bring its clutch teeth from engagement with one of the transmission gears to engagement with the other, the input shaft rotation is caused to be communicated to the transmission shaft via a different one of the transmission gears. Because the transmission gear to input gear ratio is different for each of the transmission gears, the transmission shafts is thus caused to turn at different speeds corresponding to the position of the shifter element 164. The rotation of the transmission shaft 160 is transmitted via a transmission output gear 170 and a worn input gear 172. The worm input gear turns a worm drive shaft 174 upon which is formed a drive worm 176. This worm is meshed with a pinion drive gear 178 which, as shown in FIG. 7, operates through a carriage drive shaft 179 to drive a pinion gear 180. This pinion gear is meshed with gear rack 24, FIG. 10, on the base 10. Thus, whenever the pinion gear rotates, the carriage is caused to travel along the rack 24.

As stated previously, the workpiece tube 18 is maintained under reverse or back tension at the same time that it is being pulled through the work head 12. This back tension is controlled by means of a hydraulic regulating system in the back tension carriage which maintains back tension independently of movement of the workpiece, within the limits of the control hydraulic cylinders.

As shown in the schematic of FIG. 11, the workpiece gripper 140 of the left carriage 16 is connected to the carriage via a hydraulic tension sensing arrangement. This arrangement includes a pair of hydraulic pistons 182 attached to the workpiece gripper 140 and fitted within hydraulic cylinders 184 which are attached to the carriage itself. Hydraulic fluid under pressure is generated by means of a motor 186 and pump 188, and is supplied through a check valve 190 and a control valve 192 to points on opposite sides of the pistons 182. The control valve 192 is actuated by means of an electrical solenoid 194 so that it switches the flow of fluid to selectively reverse the direction of movement of pistons 182, required when loading the machine.

It will be appreciated that with this arrangement, the workpiece gripper 140 is hydraulically connected to the carriage and will move along with the carriage so long as the amount of tension in the workpiece does not overcome the fluid force maintaining the hydraulic pistons in a general central position in the respective cylinders as shown.

Attached to the pistons 182 is a cam element 196 which engages the actuating element 198 of a variable orifice valve 200. This valve is fixedly mounted on the carriage so that rightward movement of the workpiece gripper 140 which takes place when the prescribed tension is exceeded, causes actuation of the variable orifice valve 200 and, as will be explained, controls the speed of the carriage drive motor 144.

The carriage drive motor 144 is similarly supplied with hydraulic fluid under pressure from the motor 186 and pump 188. This fluid is supplied via a high pressure line 201 to a three-position control valve 202. A return line 204 is also connected to this valve. The control valve 202 is actuated by the energization of solenoids 206 which cause it to move reciprocally and switch the application of the high pressure and drain lines 201 and 204 in alternate sequence between first and second connecting lines 208 and 210 which supply the carriage drive motor 144. A check valve 212, which permits unidirectional fluid flow, is interposed in the first connecting line 208. This valve is shunted or bypassed by means of a line 214 which passes through the variable orifice valve 200.

It can be seen that when the three-position control valve 202 is shifted so as to cause hydraulic fluid to drive the motor 144 in a direction moving the carriage toward the right, as when the workpiece 18 is being pulled through work head 12, a fluid cannot pass through the check valve 212 but must pass through the variable orifice valve 200 to the motor. Thus the motor speed, and consequently carriage speed, in this direction is controlled by the setting of the variable orifice valve; and this in turn is controlled by the position of pistons 182 in cylinders 184 being produced on the workpiece tube 18. When the three-position control valve 202 is shifted so as to cause the motor to drive in the opposite direction, fluid then passes unimpeded through the check valve 212 in the opposite direction thus allowing the motor 144 to operate at full speed irrespective of the setting of the variable orifice valve 200.

The carriage 16 is returned to the left after a workpiece has been pulled through the work head 12. During this operation, the workpiece gripper 140 is released from the workpiece and the shifter mechanism 164 is operated to enable the motor 144 to drive the carriage at relatively high speed. Hydraulic control valves 216 and 218, interconnected, respectively, with the workpiece gripper 140 and a shifter actuator piston and cylinder arrangement 220 are actuated to perform these operations by means of associated solenoids 222 and 224, respectively.

Considering now the right-hand carriage 14, its gripper mechanism 140 is operated and controlled by elements in hydraulic circuit similar to those that operated grippers 140 in carriage 16. Thus, it can be caused to grip or release a workpiece during operation of carriage 14 in either direction and particularly to be released by a shifter mechanism during return of carriage 14 to its left-hand start position. This is accomplished by provision, as in the carriage 16 circuit, of a motor 186 and a pump 188 to supply oil under pressure, with hydraulic control valves 216 and 218 connected respectively with the gripper 140 and shifter actuator and cylinder arrangement 220, these valves being operated by solenoids 222 and 224.

The controls for actuation of carriage 14 itself, however, differ from carriage 16 since the basis for its control is different. In the case of the left carriage 16, the controls are arranged to maintain a certain back tension on the workpiece. In the case of the right carriage 14, the controls are arranged to draw the workpiece through working head 12 at a speed properly related to the speed at which the working head rotates around the workpiece. This relationship of work head rotation and workpiece advancement must be maintained so that the working and tube reducing action may progress uniformly along the workpiece tube length. Therefore, the motor 144 in the right carriage 14 is controlled by the setting of manually operated flow control valve 226 so that desired speed may be set and maintained for rotation of hydraulic motor 144.

The right carriage 14, like the left carriage 16, is, however, equipped with cylinders 184 and pistons 182 which are linked to cam 196 and actuating element 198, but these are connected to three-way pressure control valve 228. This arrangement provides for safety control of the action of carriage 14 so that motor 144 rotation may be stopped if the tension sensed at the right carriage becomes greater than a maximum for safe and efficient operation. Thus it will be seen that the tension sensing arrangement does not ordinarily control rotation of motor 144, but can override its speed basis control if necessary.

I claim:
1. Tube reducing apparatus comprising an elongated base member, a work reducing head secured to said base member at an intermediate point thereof, said work reducing head comprising a frame mounted for rotation about a first axis parallel to said base member, said frame being provided with a circular opening therethrough encompassing but eccentric to said first axis, a circular adjustment ring having an eccentrically disposed inner and outer diameter, said adjustment ring being fitted for rotation within the circular opening in said frame, a circular working ring fitted for free rotation in the inner diameter of said adjustment ring, said working ring having a pressure forming internal circumferential surface which surrounds said first axis, adjustment means for rotating said adjustment ring within said frame to move the axis of said working ring relative to said first axis, said adjustment means including a first gear mounted to rotate coaxially with said frame and meshed to turn said adjustment ring within said frame by turning relative to said frame and an epicyclic type train interconnecting said frame and said first gear in a manner causing the former to turn the latter in a like direction, said epicyclic train including an intermediate section adjustable to vary the relative rotational speeds of said frame and first gear, a pair of carriages displaceable along said base member on opposite sides of said reducing head respectively, gripper means connected to each of said carriages, said gripper means each being constructed to grasp a workpiece tube which extends through said reducing head, driving means associated with one of said carriages for driving said one carriage away from said reducing head to pull said workpiece through said reducing head, tension sensing means interposed between the other carriage and its associated gripper means and adjustable braking apparatus associated with said other carriage and operative in response to said tension sensing means to control the back tension in said workpiece tube.

2. Tube reducing apparatus comprising an elongated base member, a work reducing head secured to base member at an intermediate point thereof, a pair of carriages displaceable along said base member on opposite sides of said reducing head respectively, gripper means connected to each of said carriages, said gripper means each being constructed to grasp a workpiece tube which extends through said reducing head, driving means associated with one of said carriages for driving said one carriage away from said reducing head to pull said workpiece through said work head, tension sensing means interposed between the other carriage and its associated gripper means and adjustable braking apparatus associated with said other carriage and operative in responsive to said tension sensing means to control the back tension in said workpiece tube.

3. Tube reducing apparatus comprising an elongated base member having a gear rack extending therealong, a work reducing head secured to said base member at an intermediate point thereof, first and second carriages displaceable along said base member on opposite sides of said work reducing head respectively, first and second motors mounted, respectively, within each of said carriages and drivably connected to pinion gears meshed in said rack, means operative to drive said first motor to move its carriage along said base away from work reducing head, braking means operative to variably impede the rotation of said second motor as its carriage is moved along the base toward said work reducing head, gripper means connected to each of said carriages, said gripper means each being constructed to grasp a workpiece tube which extends through said work reducing head, tension sensing means interposed between said second carriage and its associated gripper means and means interconnecting said tension sensing means and said braking means to control the latter by the former for controlling the draw tension in a workpiece tube pulled through said reducing head by said first carriage.

4. Tube reducing apparatus comprising an elongated base member having a gear rack extending therealong, a work reducing head secured to said base member at an intermediate point thereof, first and second carriages displaceable along said base member on opposite sides of said reducing head respectively, first and second hydraulic motors mounted, respectively, within each of said carriages and connected to pinion gears meshed in said rack, means operative to drive said first hydraulic motor to move its carriage along said base away said reducing head, a variable orifice hydraulic valve connected in series with said second hydraulic motor to variably impede the rotation of said second motor as its carriage is moved along said base member, gripper means connected to each of said carriages, said gripper means each being constructed to grasp a workpiece tube which extends through said reducing head, tension sensing means interposed between said second carriage and its associated gripper means and means connecting said tension sensing means to adjust said variable orifice valve for controlling the draw tension on a workpiece tube pulled through said reducing head by said first carriage.

5. Tube reducing apparatus comprising an elongated base member having a gear rack extending therealong, a work reducing head secured to said base member at an intermediate point thereof, first and second carriages displaceable along said base member on opposite sides of said reducing head respectively, first and second hydraulic motors mounted, respectively, within each of said carriages and connected to pinion gears meshed in said rack, hydraulic means operative to drive said first hydraulic motor to move its carriage along said base away from said reducing head, a variable orifice hydraulic valve connected in series with said second hydraulic motor to variably impede the rotation of said second motor as its carriage is moved along said base member, hydraulic supply means including a hydraulic source and a control valve connected to switch between a forward position and a reverse position, said control valve in said forward position connecting said second motor between said source and a sump to cause said second motor to drive its carriage away from said reducing head, said control valve in its reverse position connecting said motor into a closed hydraulic loop, a check valve shunting said variable orifice valve for by-passing same when said control valve is in its forward position, gripper means connected to each of said carriages, said gripper means each being constructed to grasp a workpiece tube which extends through said reducing head, tension sensing means interposed between said second carriage and its associated gripper means and means connecting said tension sensing means to adjust said variable orifice valve for controlling the draw tension on a one-piece tube pulled through said reducing head by said first carriage.

6. Tube reducing apparatus comprising an elongated base member, a work reducing head secured to said base member at an intermediate point thereof, a pair of carriages displaceable along said base member on opposite sides of said reducing head respectively, gripper means connected to each of said carriages, said gripper means each being constructed to grasp a work piece which extends through said reducing head, driving means associated with one of said carriages for driving said one carriage away from said reducing head to pull said workpiece through said reducing head, a hydraulic piston and cylinder assembly interconnected between said other carriage and its associated gripper means, hydraulic supply means connected to said cylinder and operative to impede movement of said piston within said cylinder, and adjustable braking apparatus associated with said other carriage and operative in response to movements of said piston within said cylinder to control the tension within said workpiece tube.

7. Tube reducing apparatus comprising an elongated base member having a gear rack extending therealong, a work reducing head secured to said base member at an intermediate point thereof, first and second carriages displaceable along said base member on opposite sides of said reducing head respectively, first and second hydraulic motors mounted respectively within each of said carriages and connected to a pinion gear meshed in said rack, hydraulic means operative to drive said first hydraulic motor to move its carriage along said base away from said work head, a variable orifice hydraulic valve connected in series with second hydraulic motor to variably impede the rotation of said second motor as its carriage is moved alongside said base member toward said reducing head, gripper means connected to each of said carriages, said gripper means each being constructed to grasp a workpiece tube which extends through said reducing head, a hydraulic piston and cylinder assembly interconnected between said second carriage and its associated gripper means, hydraulic supply means connected to said cylinder and operative to impede movement of said piston within said cylinder, and means interconnecting said piston and cylinder assembly with said variable orifice hydraulic valve to cause actuation of said valve by movements of said piston within said cylinder so as to control the draw tension on said workpiece tube as it is pulled through said reducing head by said first carriage.

8. Tube reducing apparatus comprising an elongated base member, a work reducing head secured to said base member at an intermediate point thereof, a pair of carriages displaceable along said base member and on opposite sides of said reducing head respectively, gripper means connected to each of said carriages, said gripper means each being constructed to grasp a workpiece tube which extends through said tube reducing head, driving means associated with one of said carriages for driving said one carriage away from said reducing head to pull said workpiece tube through said reducing head at a prescribed rate of speed, first tension sensing means interposed between said one carriage and its associated gripper means, said first tension sensing means being responsive to the tension in said workpiece tube exceeding a prescribed limit, second tension sensing means interposed between the other carriage and its associated gripper means, an adjustable braking apparatus associated with said other carriage and operative in response to said second tension sensing means to control the back tension in said workpiece tube.

9. Tube reducing apparatus comprising an elongated base member having a gear rack extending therealong, a work reducing head secured to said base member at an intermediate point thereof, first and second carriages displaceable along said base member and opposite sides of said reducing head respectively, first and second hydraulic motors mounted respectively within each of said carriages and drivably connected to pinion gears meshed in said rack, hydraulic means operative to drive said first motor to move its carriage along said base away from said reducing head, a variable orifice hydraulic valve connected in series with said second hydraulic motor to variably impede the rotation of said second motor as its carriage is moved along said base member, hydraulic supply means including a hydraulic source and a control valve connected to switch between a forward position and a reverse position, said control valve in said forward position connecting said second motor between said source and a sump, to cause said second motor to drive its carriage away from said reducing head, said control valve in said reverse position connecting said motor into a closed hydraulic loop, a check valve shunting said variable orifice valve for bypassing same when said control valve is in its said forward position, a hydraulic piston and cylinder assembly interconnecting said other carriage with its respective gripper means, a hydraulic circuit including a pressure source arranged to hydraulically impede movements of said piston in said cylinder, and means interconnecting said piston in said cylinder assembly in said variable orifice hydraulic valve to cause actuation of said valve by movements of said piston within said cylinder whereby there is achieved a control of the draw tension on said workpiece tube as it is pulled through said reducing head by said first carriage.

10. Tube reducing apparatus comprising a fixed work reducing head constructed to reduce the diameter of a workpiece tube pulled therethrough, a pair of carriages arranged on opposite sides of said reducing head to grip a workpiece tube passing through the reducing head, means for driving one carriage away from said reducing head to pull said workpiece tube through said head at a given speed, controllable braking means for impeding the movements of the other carriage towards said reducing head, tension sensing means for sensing the tension produced in said workpiece tube between said other carriage and said reducing head and means controlling said braking means in response to outputs from said tension sensing means to control the draw tension in said workpiece tube.

11. Tube reducing apparatus comprising a work reducing head, said reducing head including a tubular frame mounted for rotation about a first axis, a circular adjustment ring having eccentrically disposed inner and outer diameters, said adjustment ring being mounted for rotation within said frame about a second axis parallel to and displaced from said first axis at a distance permitting said inner diameter to encompass said first axis, a working ring freely rotatably mounted within said adjustment ring and having a pressure working inner circumferential surface, a first gear co-axially rotatable with said frame and meshed to turn said adjustment ring within said frame by relative rotation therewith, an epicyclic type train interconnecting said frame and said first gear in an arrangement permitting the former to drive the latter in a like direction, said epicyclic train having an intermediate section adjustable to change the relative speeds of rotation of said frame and the first gear to rotate said adjustment ring within said frame and change the position of said circular working ring relative to said first axis, a first carriage arranged on one side of said frame to pull an elongated workpiece tube through said working ring alongside first axis, a second carriage arranged on the opposite side of said frame to impede movement of said workpiece tube through said working ring, tension sensing means for sensing the tension induced in said workpiece by said second cariage and means operative in response to signals from said tension sensing means to control the degree by which said second carriage impedes the movements of said workpiece tube.

12. Apparatus for turning an adjustable element which is carried about on a rotatable body during rotation thereof, said apparatus comprising a first gear mounted co-axially with said rotatable body and meshed to turn said element in said body by turning of said first gear relative to said body, an epicyclic type train interconnecting said body and said first gear in a manner causing the former to turn the latter in a like direction, said epicyclic train including an intermediate section thereof adjustable to vary the relative rotation speeds of said body and said first gear.

13. In a tube reducing apparatus as work reducing head comprising a tubular frame mounted for rotation about a first axis, a circular adjustment ring having an eccentricaly disposed inner and outer diameter, said adjustment ring being mounted for rotation within said frame about a second axis parallel to and displaced from said first axis at a distance permitting said inner diameter to encompass said first axis, a working ring freely rotatably mounted within said adjustment ring and having a pressure working inner circumferential surface, said circular adjustment ring being formed with worm gear teeth about its outer periphery, a worm mounted for rotation in said frame and meshed with said worm teeth gear, a first gear co-axially rotatable within said frame, gear means mounted on said frame and interconnecting said worm and first gear to cause turning of the former when the latter turns relative to said frame, an epicyclic type train interconnecting said frame and said first gear in an arrangement permitting the former to drive the latter in a like direction, said epicyclic train having an intermediate section adjustable to change the relative speeds of rotation of said frame and first gear to rotate said adjustment ring within said frame and change the position of said circular working ring relative to said first axis.

14. In a tube reducing apparatus a work reducing head comprising a frame mounted for rotation about a first axis, said frame being provided with a circular opening therethrough and encompassing but eccentric to said first axis, a circular adjustment ring having eccentrically disposed inner and outer diameters, said adjustment ring being fitted for rotation within the circular opening in said frame, a circular working ring fitted for free rotation in the inner diameter of said adjustment ring, said working ring having a pressure forming internal circumferential surface which surrounds said first axis, adjustment means for rotating said adjustment ring within said frame to move the axis of said working ring relative to said first axis, said adjustment means including a first gear mounted to rotate co-axially with said frame and meshed to turn said adjustment ring within said frame by turning relative to said frame and an epicyclic type train interconnecting said frame and said first gear in a manner causing the former to turn the latter in a like direction, said epicyclic train including an intermediate section adjustable to vary the relative rotational speeds of said frame and first gear.

15. Tube reducing apparatus comprising an elongated base member, a work reducing head secured to said base member at an intermediate point thereof, a pair of carriages displaceable along said base member and on opposite sides of said reducing head respectively, gripper means connected to each of said carriages, said gripper means each being constructed to grasp a workpiece tube which extends through said tube reducing head, driving means associated with one of said carriages for driving said one carriage away from said reducing head to pull said workpiece tube through said reducing head at a prescribed rate of speed, an adjustable braking apparatus arranged to variably impede movements of the other carriage toward said reducing head, a hydraulic piston and cylinder assembly interconnecting said other carriage with its gripper means, hydraulic pressure supply and fluid flow control circuits connected to said assembly to restrict piston movements therein according to the tension existing within a workpiece tube held by said carriage, a cam and cam follower assembly mounted on said hydraulic piston and cylinder assembly in a manner causing movements in a given direction of said cam follower corresponding to piston movements in said piston and cylinder assembly, and means connecting said cam follower to control said braking apparatus to control the tension in said workpiece tube.

16. Tube reducing apparatus comprising a work reducing head, said reducing head including a tubular frame mounted for rotation about a first axis, a circular adjustment ring having eccentrically disposed inner and outer diameters, said adjustment ring being mounted for rotation within said frame about a second axis parallel to and displaced from said first axis at a distance permitting said inner diameter to encompass said first axis, a working ring freely rotatably mounted within said adjustment ring and having a pressure working inner circumferential surface, a hollow first gear mounted co-axially with and in close proximity to said frame, gear means rotatably mounted on said frame and meshed between said first gear and said adjustment ring to permit turning of said adjustment ring within said frame by turning of said first gear relative to said frame, a second gear fixed to turn with said frame, a differential gear train connected between said first and second gears in a manner such that rotation of said frame causes a like rotation of said first gear, adjustment means operative to turn an intermediate section in said differential gear train whereby to change the relative speeds of rotation of said frame and first gear and change the position of said circular working ring relative to said first axis, a first carriage arranged on one side of said frame to pull an elongated workpiece tube through said working ring alongside first axis, a second carriage arranged on the opposite side of said frame to impede movement of said workpiece tube through said working ring, tension sensing means for sensing the tension induced in said workpiece tube by said second carriage and means operative in response to signals from said tension sensing means to control the degree by which said second carriage impedes the movements of said second workpiece tube.

17. Tube reducing apparatus comprising a work reducing head, said reducing head including a tubular frame mounted for rotation about a first axis, a pair of circular adjustment rings having eccentrically disposed inner and outer diameters, said adjustment rings being mounted for rotation within said frame about second and third axes, respectively, which are parallel to and disposed on opposite sides of said first axis at distances permitting said inner diameters to encompass said first axis, a pair of working rings freely rotatably mounted within said adjustment rings in close proximity to each other, said working rings having pressure forming inner circumferential surfaces, adjustment apparatus associated with each adjustment ring, each adjustment apparatus including a hollow gear mounted to rotate co-axially with said frame and meshed to cause its respective adjustment ring to turn as said first gear turns relative to said frame, a differential gear train interconnecting said hollow gear and frame in a manner permitting the former to drive the latter in like direction and at like speed, a tool control operative to turn in synchronism an intermediate section of each differential gear train and change the positions of said working rings by equal amounts in opposite directions, a first carriage arranged on one side of said frame to pull an elongated workpiece tube through said working ring alongside first axis, a second carriage arranged on the opposite side of said frame to impede movement of said workpiece tube through said working ring, tension sensing means for sensing the tension induced in said workpiece tube by said second carriage and means operative in response to signals from said tension sensing means to control the degree by which said second carriage impedes the movements of said second workpiece tube.

18. Tube reducing apparatus comprising an elongated base member having a gear rack extending therealong, a work reducing head secured to said base member at an intermediate point thereof, said work reducing head comprising a tubular frame mounted for rotation about a first axis parallel to said base, a pair of circular adjustment rings having eccentrically disposed inner and outer diameters, said adjustment rings being mounted for rotation within said frame about second and third axes, respectively, which are parallel to and disposed on opposite sides of said first axis at distances permitting said inner diameters to encompass said first axis, a pair of working rings freely rotatably mounted within said adjustment rings in close proximity to each other, said working rings having pressure forming inner circumferential surfaces, adjustment apparatus associated with each adjustment ring, each adjustment apparatus including a hollow gear mounted to rotate co-axially with said frame and meshed to cause its respective adjustment ring to turn as said first gear turns relative to said frame, a differential gear train interconnecting said hollow gear and frame in a manner permitting the former to drive the latter in like direction at like speed, a tool control operative to turn in synchronism an intermediate section of each differential gear train and change the positions of said working rings by equal amounts in opposite directions, an elongated mandrel extending along said first axis on one side of said reducing head, said mandrel having a tip stepped in accordance with the difference in distance of each working surface from said first axis and located in the vicinity of said mandrel to one end of said base, first and second carriages displaceable along said base member on opposite sides of said work reducing head respectively, first and second motors mounted, respectively, within each of said carriages and drivably connected to pinion gears meshed in said rack, means operative to drive said first motor to move its carriage along said base away from work reducing head, braking means operative to variably impede the rotation of said second motor as its carriage is moved along the base toward said work reducing head, gripper means connected to each of said carriages, said gripper means each being constructed to grasp a workpiece tube which extends through said work reducing head, tension sensing means interposed between said second carriage and its associated gripper means and means interconnecting said tension sensing means and said braking means to control the latter by the former for controlling the draw tension in a workpiece tube pulled through said reducing head by said first carriage.

References Cited by the Examiner

UNITED STATES PATENTS

| 1,072,282 | 9/1913 | Waninger | 74—396 |
| 1,566,226 | 12/1925 | Owens | 74—396 |
| 1,703,218 | 2/1929 | Wegner | 74—396 |
| 2,108,790 | 2/1938 | Inscho | 205—7 |
| 3,019,678 | 2/1962 | Le Fiell | 80—14 |

CHARLES W. LANHAM, *Primary Examiner.*

H. DIETER HOINKES, *Assistant Examiner.*